No. 643,640. Patented Feb. 20, 1900.
A. R. FORDYCE & W. DUNCAN.
MACHINE FOR MAKING EXPANDED METALLIC LATHING.
(Application filed Mar. 23, 1899.)
(No Model.) 5 Sheets—Sheet 4.
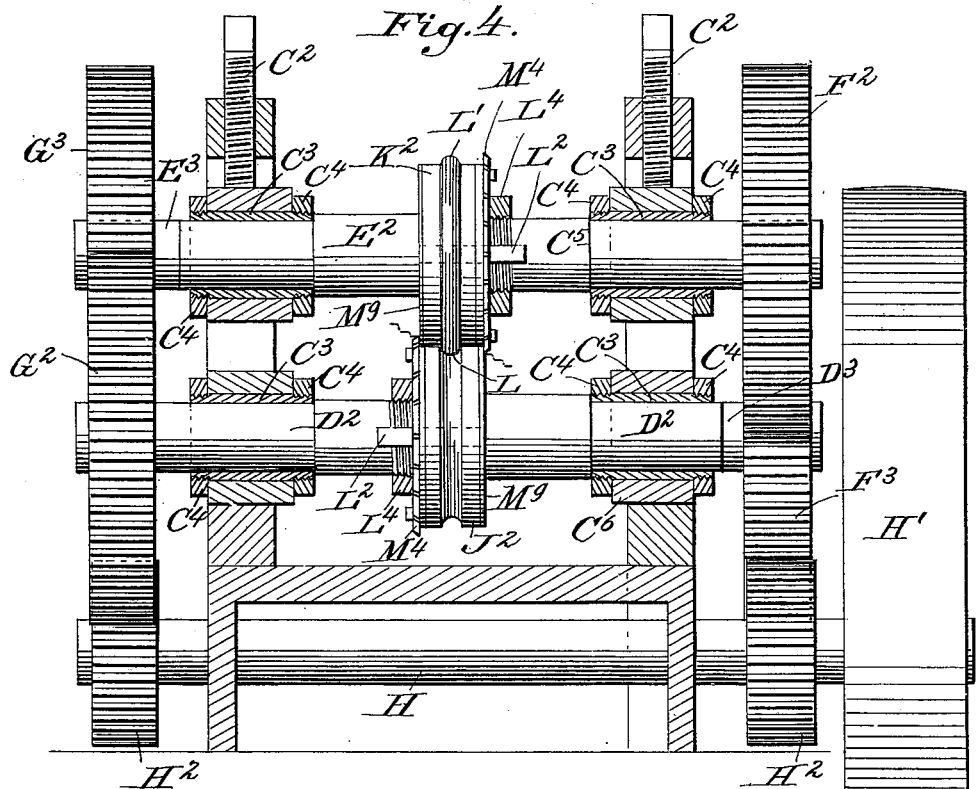
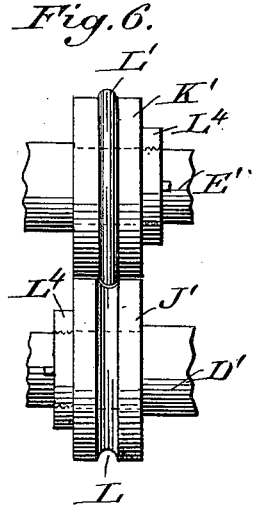
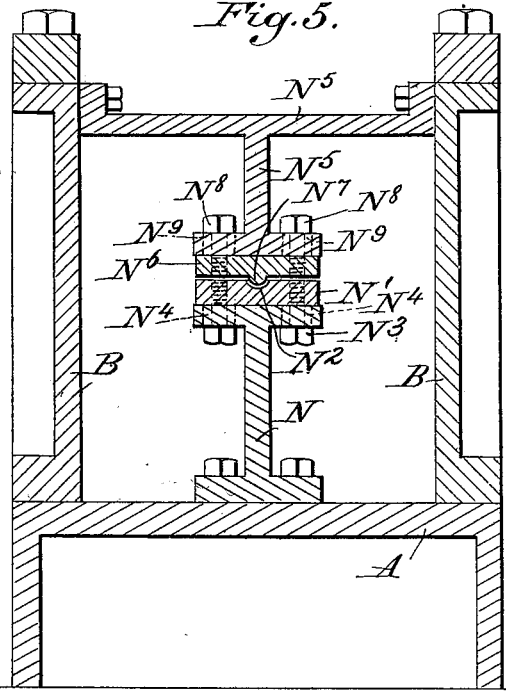
Witnesses
F. H. Schott
J. H. Gro
Inventors
Alexander R. Fordyce
William Duncan
by Grant Burroughs
Attorney No. 643,640. Patented Feb. 20, 1900.
A. R. FORDYCE & W. DUNCAN.
MACHINE FOR MAKING EXPANDED METALLIC LATHING.
(Application filed Mar. 23, 1899.)
(No Model.) 5 Sheets—Sheet 5.
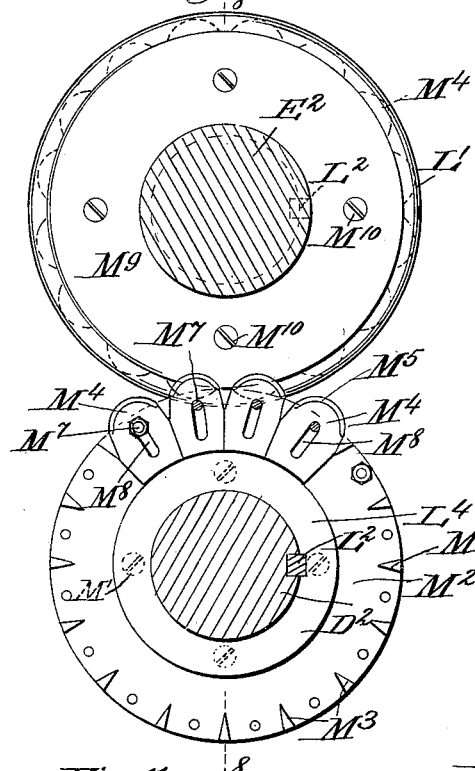
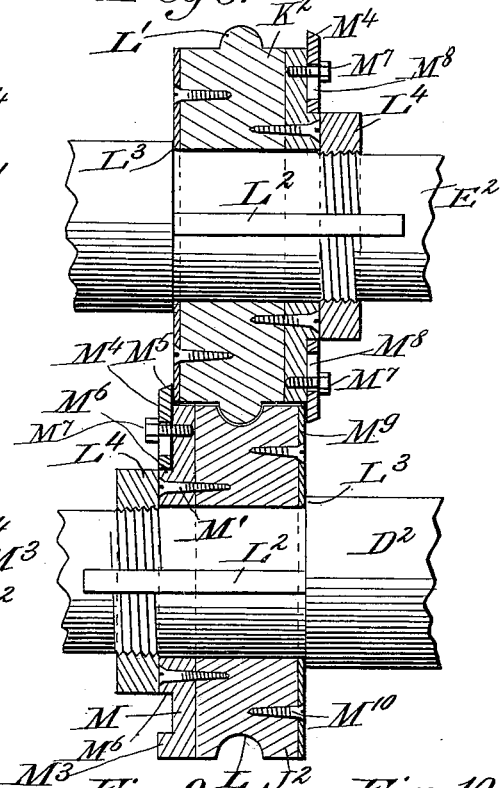
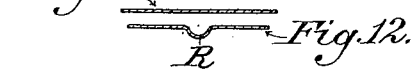
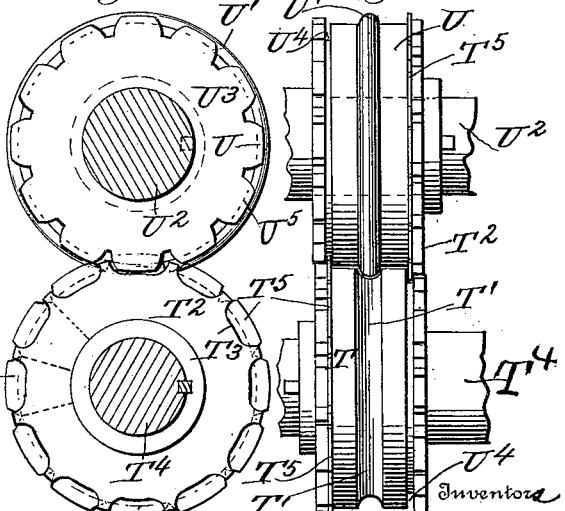

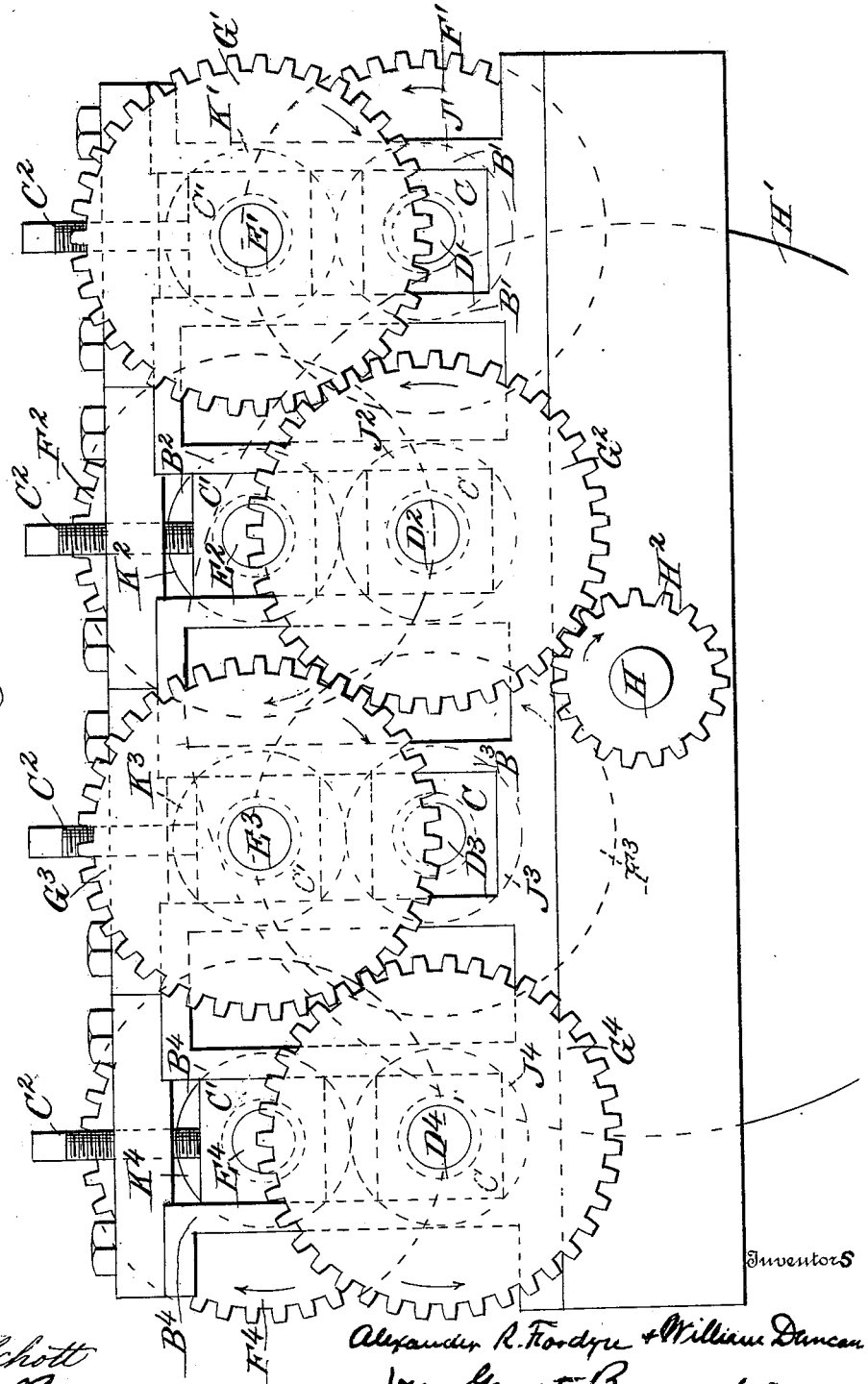

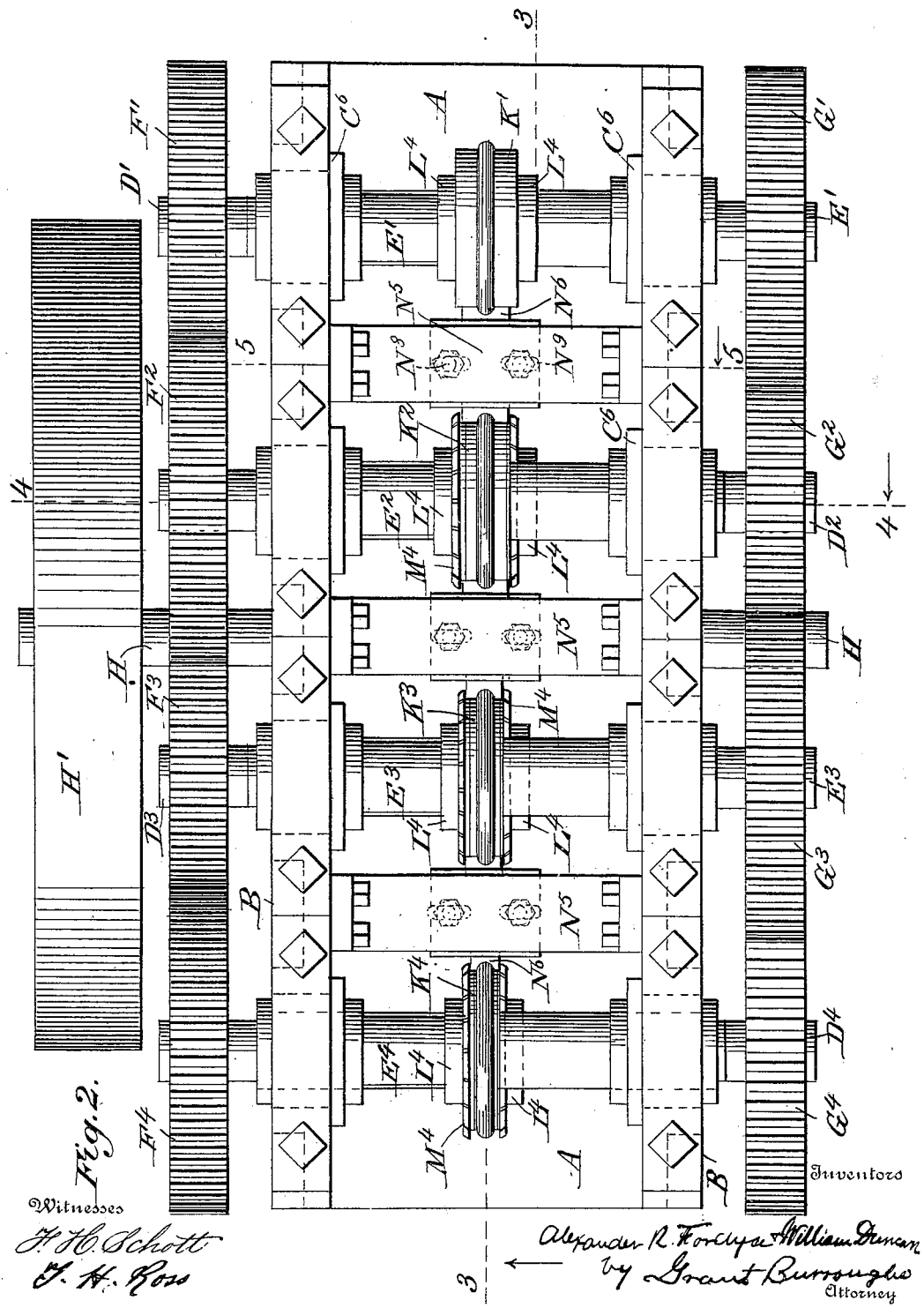

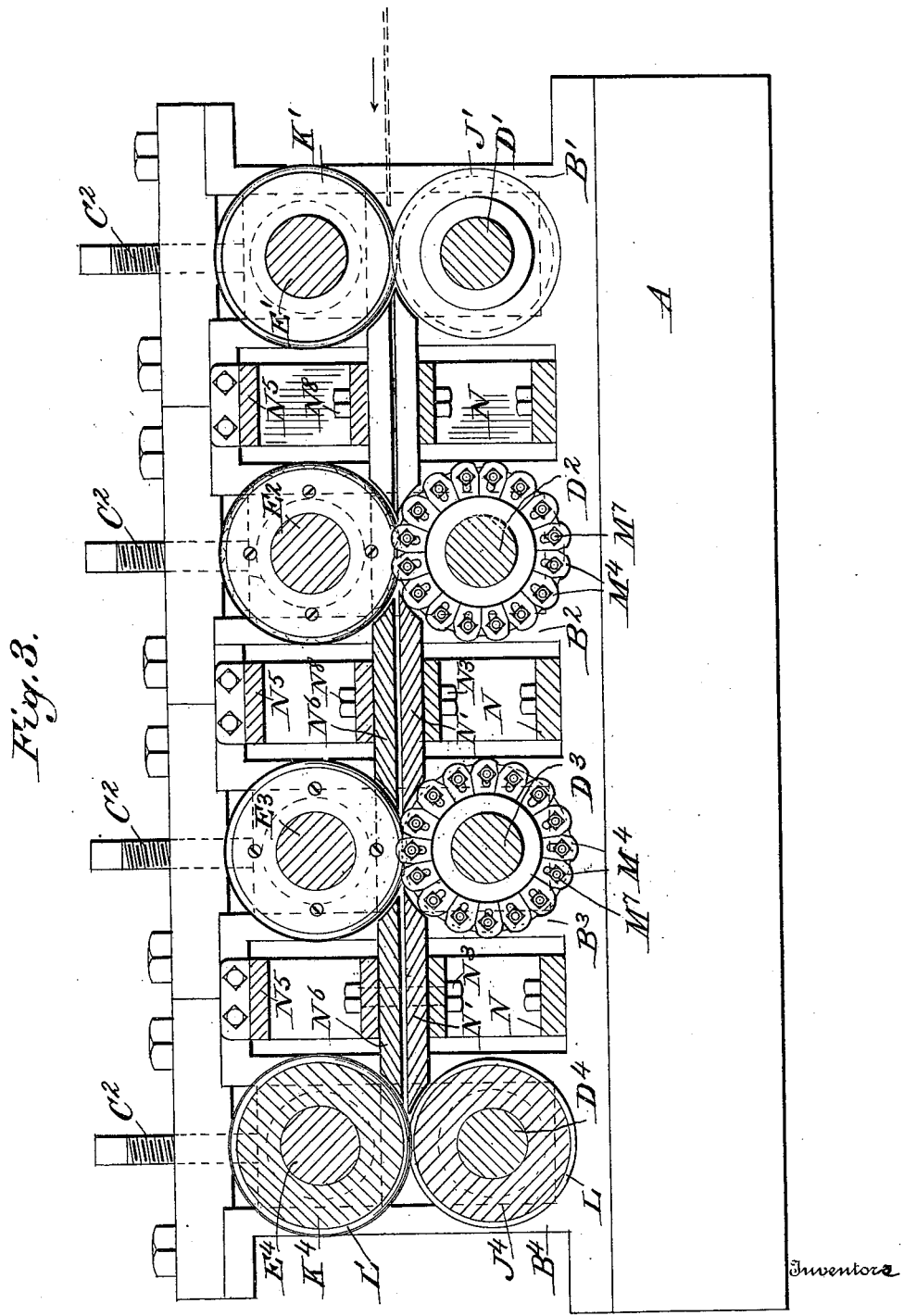

UNITED STATES PATENT OFFICE.

ALEXANDER R. FORDYCE, OF NEWARK, AND WILLIAM DUNCAN, OF KEARNY, NEW JERSEY.

MACHINE FOR MAKING EXPANDED METALLIC LATHING.

SPECIFICATION forming part of Letters Patent No. 643,640, dated February 20, 1900.

Application filed March 23, 1899. Serial No. 710,218. (No model.)

*To all whom it may concern:*

Be it known that we, ALEXANDER R. FORDYCE, of Newark, in the county of Essex, and WILLIAM DUNCAN, of Kearny, in the county of Hudson, State of New Jersey, citizens of the United States, have invented certain new and useful Improvements in Machines for Making Expanded Metallic Lathing, of which the following is a full, clear, and exact description, such as will enable those skilled in the art to which it appertains to make and use the same, reference being had to the accompanying drawings, forming a part of this specification.

This invention relates to improvements in machines for making expanded metallic lathing. Machines for this purpose as hitherto constructed consist either of reciprocating dies for simultaneously slitting and expanding the metal or of two separate roller mechanisms, one of which slits the metal and the other expands it. None of these machines, however, have a rotary mechanism for both cutting and expanding the metal simultaneously.

The invention in the present instance consists, primarily, of a roller mechanism which both cuts and expands the metal at a single operation.

The invention further consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a side elevation of a machine embodying the invention. Fig. 2 is a plan view of the same. Fig. 3 is a longitudinal vertical sectional view on the line 3 3 of Fig. 2. Fig. 4 is a transverse vertical sectional view on the line 4 4 of Fig. 2. Fig. 5 is a similar view on the line 5 5 of Fig. 2. Fig. 6 is a detail view showing the feed-rolls. Fig. 7 is an enlarged detail view showing the ends of the forming-rolls. Fig. 8 is a vertical sectional view on the line 8 8 of Fig. 7. Fig. 9 shows an end view of a modified form of the forming-rolls. Fig. 10 is a front elevation of the same. Fig. 11 is a cross-sectional view of a blank, showing its appearance before it is fed into the machine. Fig. 12 is a similar view showing the blank after it has passed between the feeding-rolls. Fig. 13 is a plan view of the finished lathing. Fig. 14 is a sectional view on the line 14 14 of Fig. 13.

The housing of the machine may be of any construction suitable in the premises. In this instance, however, it consists of the base A and the sides B secured thereon. In each side of the housing is a series of standards $B'$ to $B^4$. In the lower end of each standard is a fixed journal-box C, and in the upper end is mounted the adjustable journal-box $C'$. The adjustment of the latter is secured by the screw $C^2$, passing through the housing and impinging on its upper side.

In the lower journal-boxes C are journaled the series of shafts $D'$ to $D^4$, and in the upper boxes $C'$ are journaled the series of shafts $E'$ to $E^4$. These shafts are adjustable longitudinally in their respective journal-boxes. As the means for adjusting the shafts are all alike the description of one will suffice. The mechanism for adjusting the shaft $D^2$ will be used for the purpose. (See Fig. 4.) In each of the lower journal-boxes C is a sleeve or bushing $C^3$, forming a bearing for the end of the shaft $D^2$. The ends of the sleeve project beyond the box and are screw-threaded. On opposite sides of the box and on the screw-threaded ends of the sleeve are turned the screw-threaded rings or nuts $C^4$. By turning these rings on or off the sleeve the latter can be adjusted in the box. Each sleeve at its inner end bears against the shoulder $C^5$ on the shaft $D^2$, and thereby limits the movement of the shaft endwise in one direction. By adjusting the sleeve in which the other end of the shaft is journaled the latter is held in its adjusted position. Each journal-box is held in its standard against the longitudinal thrust of its shaft by the flanges $C^6$.

Means are provided for driving the several shafts. (See Figs. 1, 2, and 4.) The right-hand end of the shaft $D'$ projects beyond its respective journal-box and has secured thereon the gear $F'$, which meshes with the gear $F^2$ on the shaft $E^2$. The latter gear engages with the gear $F^3$ on the shaft $D^3$. The gear $F^3$ in turn meshes with the gear $F^4$ on the shaft $E^4$. On the opposite side of the machine the gear $G'$ on the shaft $E'$ engages with the gear $G^2$ on the shaft $D^2$. The latter gear meshes with the gear $G^3$ on the shaft $E^3$. The gear $G^3$ engages with the gear $G^4$ on the shaft $D^4$. In the base A of the machine is journaled the shaft H, on one end of which is the driving-pulley $H'$, and intermediate of its ends are the pinions $H^2$, engaging with the gears $G^2$ and $F^3$. By means of this system of gearing the upper and lower shafts are rotated in opposite directions and at the same rate of speed. To permit the adjustment of the upper shafts, the teeth of the gears are somewhat elongated.

On the lower shafts $D'$ to $D^4$ is mounted the series of rolls $J'$ to $J^4$, and on the upper shafts $E'$ to $E^4$ is mounted a second series of rolls $K'$ to $K^4$, adapted to coöperate with the first-mentioned series. Each pair of coöperating rolls, consisting of a lower roll and the one immediately above it, is like every other pair, except that there is a variation in length. This being so, a description of one pair will do for all. The rolls $J^2 K^2$—the second pair—will be taken as an example. (See Figs. 4, 7, and 8.)

The roll $J^2$ has in its periphery intermediate of its ends the annular groove L, with which the annular rib $L'$ of the roll $K^2$ registers. Each roll is removably mounted on its respective shaft and when in place is prevented from turning on the shaft by the key $L^2$. When in position, the roll is prevented from moving in one direction on its shaft by the shoulder $L^3$. To limit its movement in the opposite direction, a nut $L^4$ is turned onto the shaft and clamps the roll between it and the shoulder $L^3$. By turning off the nut the roll can be removed from its shaft. So far the description is applicable to the rolls $J' K'$. (See Fig. 6.) The latter are feed-rolls and serve to feed the metal blank into the machine and to form the guiding-rib in the lathing. The other rolls not only serve to carry forward the blank, but also have attached to them the cutting and expanding mechanism. As the cutting and expanding mechanism is the same on the several rolls only one need be described. (See Figs. 3, 7, and 8.)

On the end of the roll $J^2$ adjacent to the nut $L^4$ is removably attached the circular plate M of the same diameter by the screws $M'$. In the outer face of the plate is an annular recess $M^2$. Into the latter project the spurs $M^3$. Cutters $M^4$, having beveled edges $M^5$, are seated in the annular recess between the spurs. Their inner ends rest against the circular shoulder $M^6$, and their cutting edges project beyond the periphery of the plate. They are held in place by the screws $M^7$, passing through the slots $M^8$ into the plate. Whenever a cutter becomes worn or is broken, it can be readily replaced. On the opposite end of the roll adjacent to the shoulder $L^3$ of the shaft is attached the steel disk $M^9$ by the screws $M^{10}$. Over the edge of this disk the cutters of the opposite roll shear. When it becomes worn and needs grinding, the disk can be readily removed for the purpose.

The cutters on the lower rolls $J^2 J^3 J^4$ are all on the same side of the machine and cut upward against the disks $M^9$ on the upper rolls, while the cutters on the upper rolls $K^2 K^3 K^4$ are all on the opposite side of the machine and cut downward against the disks $M^9$ on the lower rolls. By this arrangement the cutters work in opposite directions.

Between a succeeding and a preceding pair of rolls a guide mechanism is interposed. (See Figs. 2, 3, and 5.) On the base A is secured the support N. On the upper end of the latter is adjustably attached the plate $N'$, having the groove $N^2$ by the screws $N^3$, passing through slots $N^4$ in the said support and engaging with the said plate. Between the sides of the housing is secured the bracket $N^5$. To the lower end of the latter is adjustably secured the plate $N^6$, provided with the rib $N^7$ by the screws $N^8$, passing through slots in the said bracket and engaging with the said plate. The relative positions of the two plates $N'$ and $N^5$ are such that the groove $N^2$ and the rib $N^7$ register. To accommodate blanks of different thickness, plates of different dimensions may be used. However, for ordinary purposes one set of guide-plates will be sufficient, as it is not necessary to have a close engagement of the guides and the blanks passing between them. Consequently they may be constructed in the first instance with considerable space between them, so that blanks of various degrees of thickness may pass between them.

It is to be observed that the rolls $J'$ to $J^4$, forming the lower series, are all mounted so as to be on the same level. The rolls $K'$ to $K^4$ of the upper series are adjustable vertically by means of the adjustable journal-boxes of their shafts, so as to coöperate with the lower rolls in forming the lathing. By adjusting the rolls endwise by means of the adjustable sleeves in which the ends of the shafts are journaled a proper registration of the grooves in the lower rolls and the ribs of the upper rolls can be secured and also a proper registration of the guide-plates, which may be also adjusted for the purpose.

Beginning with the rolls $J^2 K^2$ in the front part of the machine each succeeding pair gradually decreases in length. For instance, the rolls $J^3 K^3$ are shorter than the rolls $J^2 K^2$. Consequently the cutters carried by a succeeding pair of rolls are closer together than those carried by a preceding pair. This variation in the length of the rolls and the distances between the cutters is regular. If a plane should be passed through the machine to include in it the cutters on the roll $J^2$, the cutters on the succeeding rolls on the same side of the machine would leave the said plane by regular steps all of the same pitch. The same is true of the cutters on the opposite side of the machine. The guide-plates $N'$ and $N^6$ also gradually vary in width. Each pair of plates is of a width equal to the length of the preceding pair of rolls between their cutters, so that only the smooth part of the blank passes between them.

The operation of the device is as follows: By means of the screws $C^2$ the upper rolls $K'$ to $K^4$ are adjusted relatively to the lower rolls to adapt the machine to the thickness of the metal blank which it is desired to form into lathing. The adjustment of the rolls is such that the blank will be firmly gripped and fed through the machine. The proper registration of the several rolls and guides is secured through their respective adjustments. The machine is put in motion and the blank is introduced between the rolls $J'K'$. Beforehand, however, the blank is shaped so that its width is somewhat greater than the distance between the cutters on the rolls $J^2 K^2$, so that its edges will project beyond the said cutters to a distance equal to the width of a rib of the finished lathing. The first set of rolls $J'$ $K'$ feed the blank into the machine and form therein the guiding-rib R. (See Figs. 12, 13, and 14.) On leaving the feed-rolls the blank passes between the guide-plates $N'$ and $N^6$, succeeding the said rolls. The rib R in the blank registers with the groove $N^2$ and the rib $N^7$ of the guide-plates. By engaging with the said rib and groove of the guide-plates the blank is caused to travel in the proper path through the machine. After leaving the guide-plates the blank is engaged by the rolls $J^2 K^2$. Its path of travel is such that the rib R in the blank registers with the groove L and the annular rib $L'$ of the rolls $J^2 K^2$. The cutters $M^4$ engage with the blank and coöperating with the steel disks $M^9$ slit and expand the metal to form the keys of the lathing. As the blank is fed forward the cutters on the opposite ends of the rolls $J^2 K^2$ throw off the first rows of keys $R'$ from both sides of the blank. On leaving the rolls $J^2 K^2$ the blank passes between the guide-plates succeeding the said rolls and is engaged by the rolls $J^3 K^3$. The latter are of such length as to engage with only the uncut portion of the blank and also allow sufficient metal to project beyond their ends to form the keys. The cutters of these rolls, operating in the same way as the preceding cutters, throw off from both sides of the blank the second rows of keys $R^2$. The relative arrangement of the cutters of the preceding rolls and those of the succeeding rolls is such that the second rows of keys break joint with the keys of the first rows. On leaving the rows $J^3 K^3$ the blank passes between the succeeding guide-plates to the rolls $J^4 K^4$, where the third rows of keys $R^3$ are thrown off from opposite sides of the plate. The operation of the latter rolls and cutters is the same as that of the preceding ones. After the last keys are cut all of the blank, except the rib R and the narrow strips adjacent to it, will be cut and expanded. As the blank passes through the machine the keys are thrown from it in opposite direction on its opposite sides. The cutters on the right-hand side of the machine throw the keys outward and downward, and those on the left-hand side throw the keys outward and upward. By forming them in this way the lathing will be substantially flat. If the keys on the opposite sides of the blank should be thrown off in the same direction, the lathing would be angular and would have to be straightened in some way to serve its purpose.

In Figs. 9 and 10 a modification of the key-forming mechanism is shown. The rolls T and U in this instance have the same construction as those in the first instance. The difference is in the key-forming mechanism. The lower roll T is provided with the groove $T'$ and is mounted on the shaft $T^4$. On one end of the roll is secured the circular plate $T^2$, provided with the recesses $T^3$, extending into its periphery. Between the plate and the roll are the cutters $T^5$ in the form of thin blades. These blades register with the recesses $T^3$ and project a short distance beyond the periphery of the roll. The upper roll U, mounted on the shaft $U^2$, has a rib $U'$, registering with the groove $T'$ of the lower roll. On the end of this roll is a plate $U^3$, having a series of spurs $U^5$, adapted to register with the recesses $T^3$ in the plate $T^2$ on the lower roll. Between the end of the roll and the plate $U^3$ is a recess $U^4$, with which the cutters $T^5$ of the lower roll register. The upper roll has mounted on its other end a plate $T^2$ and cutters $T^5$ of the same construction as the same devices on the lower roll, and the latter has a plate $U^3$, provided with spurs $U^5$ and having a recess $U^4$, the same as the upper roll. The blank in passing between the rolls is slit by the cutters $T^5$, and the ribs thus formed are expanded by the spurs $U^5$, forcing them into the recesses $T^3$.

Other modifications of the invention are obvious; but the device described in the first instance is the preferred embodiment.

While in the machines hereinbefore described there are only three sets of cutters on each side, yet it is obvious that this number may be increased to any extent, according to the width of the lathing required. Also the cutters on one side of the machine may be used alone, especially if the blank should be of thin metal, as the grooved and ribbed rolls and guides would engage with the metal strongly enough to cause it to travel through the machine in the proper path.

Having thus described our invention, what we claim, and desire to secure by Letters Patent, is—

1. In a machine for making expanded metallic lathing, a plurality of mechanisms for slitting and stretching metal to form keys successively operating in different parallel planes; each of said mechanisms consisting of a series of cutters projecting radially from a common rotatable axis and of a cutting edge coöperating with said cutters.

2. In a machine for making expanded metallic lathing, a plurality of mechanisms for slitting and stretching metal to form keys successively operating in different parallel planes, each of said mechanisms consisting of a series of cutters projecting radially from a common rotatable axis and of an engaging edge coöperating with said cutters, and guides interposed between said mechanisms for directing the course of the blank.

3. In a machine for making expanded metallic lathing, a plurality of mechanisms for slitting and stretching metal to form keys successively operating in different parallel planes; each of said mechanisms consisting of a series of cutters projecting radially from a common rotatable axis and of a rotary engaging edge coöperating with said cutters.

4. In a machine for making expanded metallic lathing, a plurality of mechanisms for slitting and stretching metal to form keys successively operating in different parallel planes; each of said mechanisms consisting of a series of cutters projecting radially from a common rotatable axis and of a rotary engaging edge coöperating with said cutters, and guides interposed between said mechanisms for directing the course of the blank.

5. In a machine for making expanded metallic lathing, a plurality of mechanisms progressively arranged and successively operating in different planes for throwing off keys from a blank.

6. In a machine for making expanded metallic lathing, a plurality of rotary mechanisms progressively arranged and successively operating in different planes for throwing off keys from a blank.

7. In a machine for making expanded metallic lathing, a plurality of rotary mechanisms progressively arranged and successively operating in different planes for throwing off keys from a blank, and means for driving said rotary mechanisms at the same rate of speed.

8. In a machine for making expanded metallic lathing, a series of pairs of coöperating feed-rolls, and a slitting and stretching mechanism carried by each pair of said rolls.

9. In a machine for making expanded metallic lathing, a plurality of rotary mechanisms progressively arranged and successively operating in different planes for throwing off keys from a blank, and guides interposed between said rotary mechanisms.

10. In a machine for making expanded metallic lathing, a plurality of rotary mechanisms progressively arranged and successively operating in different planes for throwing off keys from a blank, guides interposed between said rotary mechanisms, and means for driving said rotary mechanisms at the same rate of speed.

11. In a machine for making expanded metallic lathing, a series of pairs of coöperating rolls, the rolls of a succeeding pair being shorter than the rolls of a preceding pair, and rotary cutters carried by said rolls and operating in different parallel planes.

12. In a machine for making expanded metallic lathing, a series of pairs of coöperating rolls, the rolls of a succeeding pair being shorter than the rolls of a preceding pair, rotary cutters carried by said rolls and operating in different parallel planes, and guides interposed between said pairs of rolls.

13. In a machine for making expanded metallic lathing, a series of pairs of coöperating feed-rolls progressively arranged and successively operating, and a slitting and stretching mechanism carried by each pair of said rolls, the slitting and stretching mechanism carried by one pair of rolls operating in a plane different from the planes in which the slitting and stretching mechanisms carried by the other pairs of rolls operate.

14. In a machine for making expanded metallic lathing, a roll, a series of cutters circularly arranged on an end of said roll, a cutting edge coöperating with said cutters, a second roll, a second series of cutters circularly arranged on the end of said second roll and turning in a plane different from that in which the first-mentioned cutters turn, the relative arrangement of the two series of cutters being such that the cuts made by the first series of cutters break joint with those made by the second series of cutters.

15. In a machine for making expanded metallic lathing, a series of grooved and ribbed rolls arranged in pairs of different lengths, and grooved and ribbed guides interposed between said pairs of rolls.

16. In a machine for making expanded metallic lathing, a series of rolls adjustable endwise and arranged in pairs of different lengths, and adjustable guides interposed between said pairs.

17. In a machine for making expanded metallic lathing, a journal-box, a sleeve adjustable in said box, nuts turned on the ends of said sleeve for holding it in its adjustments, and a shaft journaled in said sleeve and having a shoulder abutting an end of said sleeve.

In testimony whereof we hereunto affix our signatures in the presence of two witnesses.

ALEXANDER R. FORDYCE.
WILLIAM DUNCAN.

Witnesses:
MOSES J. DE WITT,
CHAS. E. BALDWIN.